(12) United States Patent
Boyer (10) Patent No.: US 12,539,015 B2
(45) Date of Patent: Feb. 3, 2026

(54) DISHWASHER WITH PERSONALIZED UTENSIL DETECTION AND SCANNING AIDS THEREFOR

(71) Applicant: Midea Group Co., Ltd., Foshan (CN)

(72) Inventor: Joel Boyer, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 18/461,182

(22) Filed: Sep. 5, 2023

(65) Prior Publication Data
US 2025/0072706 A1   Mar. 6, 2025

(51) Int. Cl.
| | |
|---|---|
| *A47L 15/42* | (2006.01) |
| *A47L 15/00* | (2006.01) |
| *A47L 15/22* | (2006.01) |
| *A47L 15/46* | (2006.01) |

(52) U.S. Cl.
CPC ....... *A47L 15/4295* (2013.01); *A47L 15/0021* (2013.01); *A47L 15/0063* (2013.01); *A47L 15/22* (2013.01); *A47L 15/0018* (2013.01); *A47L 15/46* (2013.01); *A47L 2401/00* (2013.01); *A47L 2401/04* (2013.01); *A47L 2501/30* (2013.01)

(58) Field of Classification Search
CPC ... G06T 7/50; G06T 7/55; G06T 2207/20081; G06T 2207/20084
See application file for complete search history.

(56) References Cited

U.S. PATENT DOCUMENTS

| | | | |
|---|---|---|---|
| 6,621,921 B1 * | 9/2003 | Matsugu | G06T 7/55 382/154 |
| 7,621,605 B2 | 11/2009 | Bond | |
| 7,842,137 B2 | 11/2010 | Classen | |
| 7,935,194 B2 | 5/2011 | Rolek | |
| 8,220,472 B2 | 7/2012 | Kaczmarek | |
| 8,509,473 B2 | 8/2013 | Wagner | |
| 8,696,827 B2 | 4/2014 | Ashrafzadeh | |
| 9,610,000 B2 | 4/2017 | Rehm | |
| 9,901,240 B2 | 2/2018 | Lee | |
| 10,080,477 B2 | 9/2018 | Fauth | |
| 11,058,281 B2 | 7/2021 | Fawaz | |

(Continued)

FOREIGN PATENT DOCUMENTS

| | | | |
|---|---|---|---|
| CN | 111568328 A | * | 8/2020 |
| CN | 112869674 A | | 6/2021 |

(Continued)

OTHER PUBLICATIONS

Chaudhri, Omair, United States Patent and Trademark Office, Non-Final Office Action issued in U.S. Appl. No. 16/446,696, 46 pages, dated Feb. 11, 2021.

(Continued)

*Primary Examiner* — Kaj K Olsen
*Assistant Examiner* — Richard Z. Zhang
(74) *Attorney, Agent, or Firm* — Gray Ice Higdon (57) ABSTRACT

A dishwasher may utilize personalized utensil detection to detect the utensils regularly washed by the dishwasher, in part based upon training of a personalized machine learning model used in personalized utensil detection. One or more scanning aids may also be used to provide a common frame of reference when capturing images of utensils used to train the personalized machine learning model.

21 Claims, 7 Drawing Sheets

(56) References Cited

U.S. PATENT DOCUMENTS

| | | |
|---|---|---|
| 11,634,849 B2 | 4/2023 | Park |
| 2006/0119236 A1 | 6/2006 | Dickson |
| 2010/0126526 A1 | 5/2010 | Poyner |
| 2010/0170544 A1 | 7/2010 | Casonato |
| 2012/0138092 A1 | 6/2012 | Ashrafzadeh |
| 2013/0268134 A1 | 10/2013 | Tuller |
| 2014/0145573 A1 | 5/2014 | Cox |
| 2014/0230865 A1 | 8/2014 | Rehm |
| 2015/0071487 A1* | 3/2015 | Sheng ............ G06F 16/50 382/103 |
| 2016/0324396 A1 | 11/2016 | Hong |
| 2017/0202426 A1 | 7/2017 | Bosen |
| 2018/0168425 A1 | 6/2018 | Wilson |
| 2019/0200841 A1* | 7/2019 | Yoshimoto ........ A47L 15/42 |
| 2019/0290097 A1 | 9/2019 | Naik |
| 2019/0343367 A1 | 11/2019 | Jung |
| 2019/0380559 A1* | 12/2019 | Lee ............... A47L 15/4295 |
| 2020/0138261 A1 | 5/2020 | Terrádez Alemany |
| 2020/0209819 A1* | 7/2020 | Xu .................... G06N 20/00 |
| 2020/0281440 A1 | 9/2020 | Disch |
| 2021/0093154 A1* | 4/2021 | Boyer ................ A47L 15/46 |
| 2022/0092808 A1 | 3/2022 | Kwon |
| 2022/0092844 A1* | 3/2022 | Daniels ............. G06V 40/20 |
| 2022/0095884 A1 | 3/2022 | Park |
| 2023/0172744 A1* | 6/2023 | Sekino ................ G06T 7/90 604/327 |
| 2023/0351731 A1* | 11/2023 | Stadelmann ......... G06V 20/698 |
| 2023/0419410 A1* | 12/2023 | Samarasekera ........ G06Q 40/08 |
| 2024/0335083 A1* | 10/2024 | Hwang ................ A47L 15/0063 |
| 2024/0371141 A1* | 11/2024 | Murthy ................ G06N 3/0464 |

FOREIGN PATENT DOCUMENTS

| | | |
|---|---|---|
| DE | 102012209679 A1 | 12/2013 |
| DE | 102014213418 A1 | 1/2016 |
| DE | 102016106430 A1 | 11/2016 |
| EP | 1192893 A2 | 4/2002 |
| EP | 3427630 A1 | 1/2019 |
| EP | 3767580 A1 | 1/2021 |
| EP | 3530172 B1 | 6/2022 |
| JP | 2003235781 A | 8/2003 |
| WO | 2017200680 A1 | 11/2017 |
| WO | 2017202574 A1 | 11/2017 |
| WO | 2018044094 A1 | 3/2018 |
| WO | 2018128258 A1 | 7/2018 |
| WO | 2019015996 A1 | 1/2019 |
| WO | WO2023038175 * | 3/2023 |

OTHER PUBLICATIONS

Chaudhri, Omair, United States Patent and Trademark Office, Notice of Allowance issued in U.S. Appl. No. 16/446,696, 24 pages, dated Jun. 8, 2021.

* cited by examiner

DISHWASHER WITH PERSONALIZED UTENSIL DETECTION AND SCANNING AIDS THEREFOR

BACKGROUND

Dishwashers are used in many single-family and multi-family residential applications to clean dishes, silverware, cutlery, cups, glasses, pots, pans, etc. (collectively referred to herein as "utensils"). Many dishwashers rely primarily on rotatable spray arms that are disposed at the bottom and/or top of a tub and/or are mounted to a rack that holds utensils. A spray arm is coupled to a source of wash fluid and includes multiple apertures for spraying wash fluid onto utensils, and generally rotates about a central hub such that each aperture follows a circular path throughout the rotation of the spray arm. The apertures may also be angled such that force of the wash fluid exiting the spray arm causes the spray arm to rotate about the central hub.

While traditional spray arm systems are simple and mostly effective, they have the shortcoming of that they must spread the wash fluid over all areas equally to achieve a satisfactory result. In doing so, resources such as time, energy and water are generally wasted because wash fluid cannot be focused precisely where it is needed. Moreover, because spray arms follow a generally circular path, the corners of a tub may not be covered as thoroughly, leading to lower cleaning performance for utensils located in the corners of a rack. In addition, in some instances the spray jets of a spray arm may be directed to the sides of a wash tub during at least portions of the rotation, leading to unneeded noise during a wash cycle.

Various efforts have been made to attempt to customize wash cycles to improve efficiency as well as wash performance, e.g., using cameras and other types of image sensors to sense the contents of a dishwasher, as well as utilizing spray devices that provide more focused washing in particular areas of a dishwasher. Nonetheless, a significant need still exists in the art for greater efficiency and efficacy in dishwasher performance.

Efforts have been made, for example, to develop image recognition systems capable of detecting utensils in a dishwasher. Such image recognition systems, however, are generally designed to be global and generalized in nature, such that the same image recognition system can be used with any dishwasher. Dishwashers, however, are used in many different individual applications, and may be used to wash a wide variety of different types of utensils, including utensils for which an image recognition system has not been specifically designed to detect. Thus, a risk exists that an image recognition system may have poor performance when encountering some utensils, resulting in reduced dishwasher performance.

SUMMARY

The herein-described embodiments address these and other problems associated with the art by providing in some instances a dishwasher that utilizes personalized utensil detection to detect the utensils regularly washed by the dishwasher. In addition, in some instances, training of a personalized machine learning model used in personalized utensil detection may be facilitated by the use of one or more scanning aids that provide a common frame of reference when capturing images of utensils used to train the personalized machine learning model.

Therefore, consistent with one aspect of the invention, a dishwasher may include a wash tub, at least one spray device disposed in the wash tub, a fluid supply configured to supply wash fluid to the at least one spray device during a wash cycle that washes a load, the fluid supply including at least one pump, and a controller coupled to the at least one pump. The controller is configured to control at least one parameter of the wash cycle based at least in part on a utensil detected in the load, the utensil detected in the load is of a personalized utensil type, and the utensil is detected in the load by processing image data from an image captured of at least a portion of the load with a personalized machine learning model that is trained to detect the personalized utensil type using one or more training images captured of the utensil subsequent to installation of the dishwasher.

In some embodiments, the personalized machine learning model is disposed in the dishwasher, and the controller is configured to detect the utensil in the load by executing the personalized machine learning model. Also, in some embodiments, the personalized machine learning model is disposed in a user device in communication with the dishwasher, and the controller is configured to detect the utensil in the load by communicating the image data to the user device and receiving the personalized utensil type or the at least one parameter from the user device. Further, in some embodiments, the personalized machine learning model is disposed in a remote service in communication with the dishwasher, and the controller is configured to detect the utensil in the load by communicating the image data to the remote service and receiving the personalized utensil type or the at least one parameter from the remote service.

Some embodiments may further include an image sensor, and the controller is configured to capture the image using the image sensor. In some embodiments, the controller is in communication with a user device including an image sensor configured to capture the image, and the controller is configured to receive the image data from the user device.

In addition, some embodiments may also include a scanning aid disposed on a surface of the dishwasher, and the scanning aid is configured to support the utensil during training of the personalized machine learning model. In some embodiments, the scanning aid includes a plurality of concentric circles from which a size of the utensil may be determined during training of the personalized machine learning model. In addition, in some embodiments, the scanning aid includes a plurality of radial segments from which an angular orientation of the utensil may be determined during training of the personalized machine learning model. Moreover, in some embodiments, at least a portion of the scanning aid is supported on a rotatable support, and the rotatable support is motorized or is manually rotatable.

Some embodiments may also include a mobile device holder mounted to the dishwasher and configured to support a mobile device to capture images of the utensil during training of the personalized machine learning model. In some embodiments, the parameter is a wash temperature, an operation duration, a number of operations, a spray pattern, a fluid pressure, a soak time, a spray isolation, or a control parameter for one or more controllably-movable sprayers.

Consistent with another aspect of the invention, an apparatus may include a memory storing a personalized machine learning model, and at least one processor configured to train the personalized machine learning model to detect a personalized utensil type for a utensil to be washed in a dishwasher using one or more training images captured subsequent to installation of the dishwasher.

Moreover, in some embodiments, the memory and the at least one processor are disposed in the dishwasher. In some embodiments, the memory and the at least one processor are disposed in a user device or remote service in communication with the dishwasher. Some embodiments may also include an image sensor disposed on the dishwasher and configured to capture the one or more training images.

In addition, some embodiments may also include a scanning aid configured to support the utensil during training of the personalized machine learning model. In some embodiments, the scanning aid is supported on the dishwasher. Moreover, in some embodiments, the scanning aid is separate from the dishwasher.

Also, in some embodiments, the at least one processor is further configured to detect the utensil in a load to be washed by the dishwasher using the personalized machine learning model after training of the personalized machine learning model and using one or more images captured of the load prior to a wash cycle performed in the dishwasher. In some embodiments, the at least one processor is further configured to detect an unknown utensil in the one or more images and prompt a user to train the personalized machine learning model to detect the unknown utensil. In addition, in some embodiments, the personalized machine learning model is trained by personalizing a generalized machine learning model utilized with the dishwasher prior to training for any user-specific utensils.

Also, in some embodiments, the at least one processor is configured to detect that the utensil is already recognized during training of the personalized machine learning model. Moreover, in some embodiments, the at least one processor is configured to, in response to detecting that the utensil is already recognized, train the personalized machine learning model using stored training data associated with the utensil and/or notify a user that the utensil is already recognized.

Consistent with another aspect of the invention, a dishwasher may include a wash tub, a door providing external access to the wash tub, a scanning aid disposed on an inner surface of the door and configured to support a utensil when the door is in an open position, where the utensil is of a personalized utensil type, at least one spray device disposed in the wash tub, a fluid supply configured to supply wash fluid to the at least one spray device during a wash cycle that washes a load including the utensil, the fluid supply including at least one pump, and a controller coupled to the at least one pump. The controller is configured to control at least one parameter of the wash cycle based at least in part on detection of the utensil in the load, and the utensil is detected in the load by processing image data from an image captured of at least a portion of the load with a personalized machine learning model that is trained to detect the personalized utensil type using one or more training images captured subsequent to installation of the dishwasher and while the utensil is supported on the scanning aid.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

In the embodiments discussed below, a dishwasher may utilize personalized utensil detection to detect the utensils regularly washed by the dishwasher. In addition, in some embodiments, training of a personalized machine learning model used in personalized utensil detection may be facilitated by the use of one or more scanning aids that provide a common frame of reference when capturing images of utensils used to train the personalized machine learning model.

Figure 1:
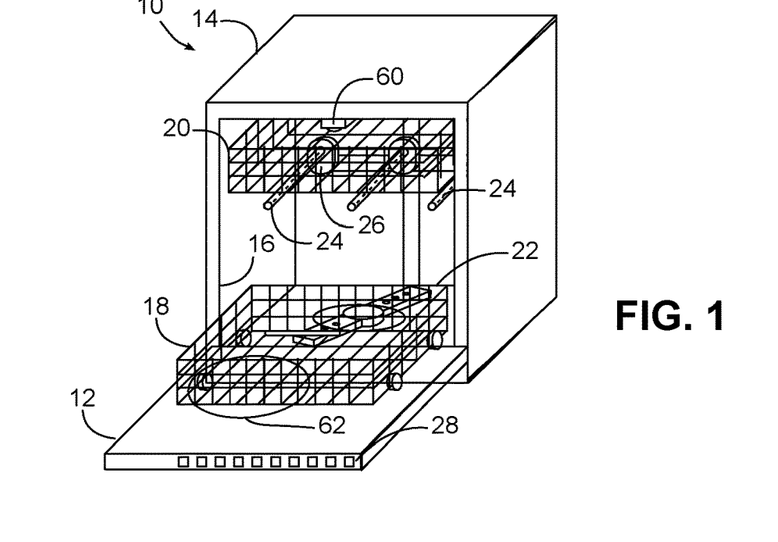
FIG. 1 is a perspective view of a dishwasher consistent with some embodiments of the invention.

Turning now to the drawings, wherein like numbers denote like parts throughout the several views, FIG. 1 illustrates an example dishwasher 10 in which the various technologies and techniques described herein may be implemented. Dishwasher 10 is a residential-type built-in dishwasher, and as such includes a front-mounted door 12 that provides access to a wash tub 14 housed within a cabinet or housing 16. Door 12 is generally hinged along a bottom edge and is pivotable between the opened position illustrated in FIG. 1 and a closed position (not shown). When door 12 is in the opened position, access is provided to one or more sliding racks, e.g., lower rack 18 and upper rack 20, within which various utensils are placed for washing. Lower rack 18 may be supported on rollers, while upper rack 20 may be supported on side rails, and each rack is movable between loading (extended) and washing (retracted) positions along a substantially horizontal direction. One or more spray devices, e.g., a lower spray arm 22 and a plurality of tubular spray elements (TSEs) 24, may be provided to direct a spray of wash fluid onto utensils in the wash tub. In addition, in some embodiments one or more spray devices (e.g., tubular spray elements 24) may be controllably-movable, e.g., using a tubular spray element drive 26, such that a direction of spray can be controlled. In some embodiments, all spray devices may be controllably-movable, while in other embodiments, no spray devices may be controllably-movable.

Control over dishwasher 10 by a user is generally managed through a control panel 28 typically disposed on a top or front of door 12, and it will be appreciated that in different dishwasher designs, the control panel may include various types of input and/or output devices, including various knobs, buttons, lights, switches, textual and/or graphical displays, touch screens, etc. through which a user may configure one or more settings and start and stop a wash cycle.

The embodiments discussed hereinafter will focus on the implementation of the hereinafter-described techniques within a hinged-door dishwasher. However, it will be appreciated that the herein-described techniques may also be used in connection with other types of dishwashers in some embodiments. For example, the herein-described techniques may be used in commercial applications in some embodiments. Moreover, at least some of the herein-described techniques may be used in connection with other dishwasher configurations, including dishwashers utilizing sliding drawers.

Figure 2:
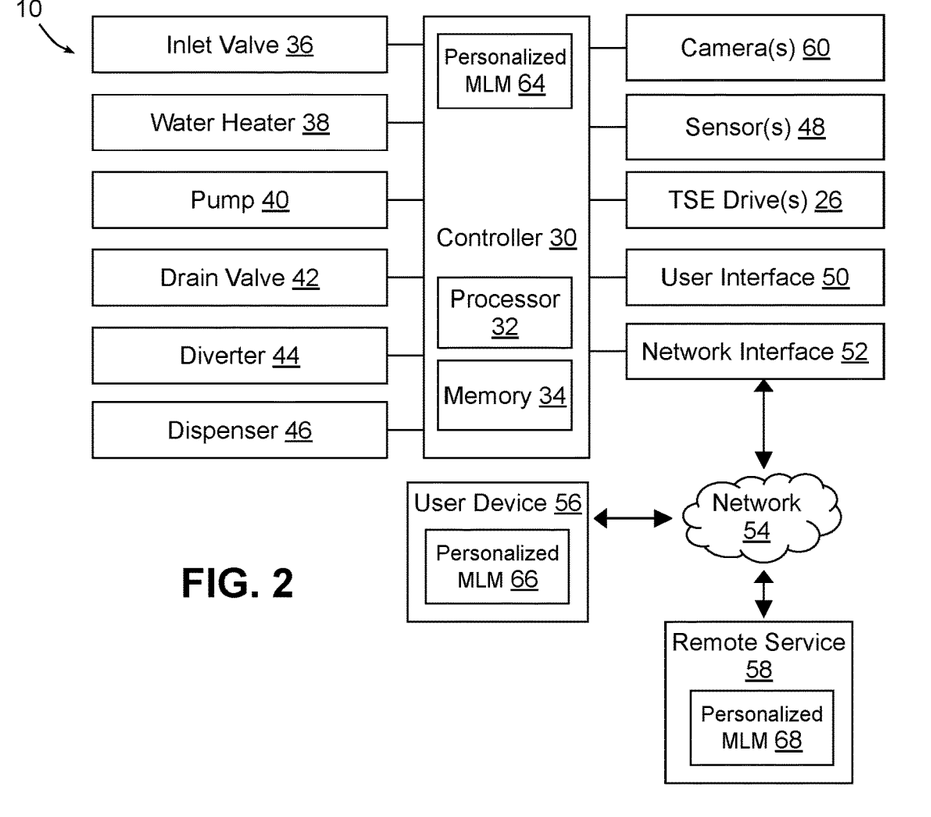
FIG. 2 is a block diagram of an example control system for the dishwasher of FIG. 1.

Now turning to FIG. 2, dishwasher 10 may be under the control of a controller 30 that receives inputs from a number of components and drives a number of components in response thereto. Controller 30 may, for example, include one or more processors 32 and a memory 34 within which may be stored program code for execution by the one or more processors. The memory may be embedded in controller 30, but may also be considered to include volatile and/or non-volatile memories, cache memories, flash memories, programmable read-only memories, read-only memories, etc., as well as memory storage physically located elsewhere from controller 30, e.g., in a mass storage device or on a remote computer interfaced with controller 30.

As shown in FIG. 2, controller 30 may be interfaced with various components, including one or more tubular spray element drives 26 and/or the drive systems of other controllably-movable sprayers, as well as an inlet valve 36 that is coupled to a water source to introduce water into wash tub 14, which when combined with detergent, rinse agent and/or other additives, forms various wash fluids. A wash fluid may be considered to be a fluid, generally a liquid, incorporating at least water, and in some instances, additional components such as detergent, rinse aid, and other additives. During a rinse operation, for example, the wash fluid may include only water. A wash fluid may also include steam in some instances.

Controller 30 may also be coupled to a water heater 38 that heats fluids, a pump 40 that recirculates fluid within the wash tub by pumping fluid to the wash arms and other spray devices in the dishwasher, a drain valve 42 that is coupled to a drain to direct fluids out of the dishwasher, and a diverter 44 that controls the routing of pumped fluid to different wash arms and/or other spray devices during a wash cycle. In some embodiments, a single pump 40 may be used, and drain valve 42 may be configured to direct pumped fluid either to a drain or to the diverter 44 such that pump 40 is used both to drain fluid from the dishwasher and to recirculate fluid throughout the dishwasher during a wash cycle. In other embodiments, separate pumps may be used for draining the dishwasher and recirculating fluid. Diverter 44 in some embodiments may be a passive diverter that automatically sequences between different outlets, while in some embodiments diverter 44 may be a powered diverter that is controllable to route fluid to specific outlets on demand. Generally, pump 40 may be considered to be a fluid supply in some embodiments as pump 40 supplies a pressurized source of fluid to diverter 44 for distribution to one or more spray arms and/or spray devices.

Controller 30 may also be coupled to a dispenser 46 to trigger the dispensing of detergent and/or rinse agent into the wash tub at appropriate points during a wash cycle. Additional sensors 48 and actuators may also be used in some embodiments, including, for example, a temperature sensor to determine a wash fluid temperature, a door switch to determine when door 12 is latched, various turbidity or conductivity sensors, etc. Moreover, controller 30 may be coupled to a user interface 50 including various input/output devices such as knobs, dials, sliders, switches, buttons, lights, textual and/or graphics displays, touch screen displays, speakers, image capture devices, microphones, etc. for receiving input from and communicating with a user (e.g., at least partially disposed on control panel 28 of FIG. 1).

In some embodiments, controller 30 may also be coupled to one or more network interfaces 52, e.g., for interfacing with external devices via wired and/or wireless networks 54 such as Ethernet, Bluetooth, NFC, cellular and other suitable networks. For example, dishwasher 10 may interface with one or more user devices 56, e.g., to permit consumer remote control of dishwasher 10 and/or to provide status information to a consumer. Dishwasher 10 may also interface with one or more remote services 58, e.g., for diagnostics, maintenance, system updates, remote control, and/or practically any other suitable purpose. Additional components may also be interfaced with controller 30, as will be appreciated by those of ordinary skill having the benefit of the instant disclosure.

Moreover, in some embodiments, at least a portion of controller 30 may be implemented externally from dishwasher 10, e.g., within a mobile device, a cloud computing environment, etc., such that at least a portion of the functionality described herein is implemented within the portion of the controller that is externally implemented. In some embodiments, controller 30 may operate under the control of an operating system and may execute or otherwise rely upon various computer software applications, components, programs, objects, modules, data structures, etc. In addition, controller 30 may also incorporate hardware logic to implement some or all of the functionality disclosed herein. Further, in some embodiments, the sequences of operations performed by controller 30 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

In addition, with reference to FIG. 1, as discussed in greater detail below, for use in connection with personalized utensil detection, dishwasher 10 may include one or more image sensors (e.g., camera(s) 60) for capturing images of utensils in a load and/or for capturing training images of user-specific utensils, as well as one or more scanning aids 62 for use in facilitating interpretation of the training images. In addition, with reference to FIG. 2, personalized utensil detection may be implemented using a personalized machine learning model, which may be local to a dishwasher (e.g., as represented by personalized machine learning model 64), or may be external to a dishwasher, e.g., in a user device (as represented by personalized machine learning model 66) or in a remote service (as represented by personalized machine learning model 68).

Numerous variations and modifications to the dishwasher illustrated in FIGS. 1-2 will be apparent to one of ordinary skill in the art, as will become apparent from the description below. Therefore, the invention is not limited to the specific implementations discussed herein.

Personalized Utensil Detection

In some embodiments of the invention, it may be desirable to utilize an imaging system to evaluate the contents of a dishwasher prior to and/or during a wash cycle for the purposes of optimizing performance of the dishwasher. The imaging system in some embodiments may include one or more cameras or other imaging devices disposed within the dishwasher and capable of sensing one or more objects within the dishwasher. In other embodiments, one or more cameras or other imaging devices disposed externally from the dishwasher, e.g., as may be disposed on a mobile device (e.g., a mobile phone, a digital camera, a tablet) or other computing device may be used to capture images of the contents of a dishwasher prior to a wash cycle. In some embodiments, the captured images may be two dimensional images, while in other embodiments, the captured images may be three dimensional in nature, and may be captured using distance or range information such that three-dimensional models of objects may be constructed.

Image analysis may then be performed to identify one or more objects within the dishwasher such that configuration determinations may be made based upon such identifications. Objects may include utensils placed in the dishwasher for washing, e.g., dishware, drinkware, silverware, pots, pans, baking sheets, baby bottles, pitchers, knives, tools. Objects may also include components or areas of a dishwasher, e.g., a rack, a sprayer, a basket (e.g., a silverware basket), a filter, a heating coil, an imaging device, a wall, a door, a dispenser, etc. Objects may also include detergent introduced into a dishwasher in some embodiments.

In some embodiments, objects may be identified only based upon a count, e.g., there are 17 objects in the rack. Objects may also be identified in some embodiments by a class, e.g., drinkware, silverware, dishware, etc., while in other embodiments, objects may be identified with greater particularity, e.g., a cup, a glass, a fork, or even with more detail, e.g., 12 oz ceramic cup, a 12 inch cast iron skillet, etc. Objects may be identified as having particular materials (e.g., glass, ceramic, metal), having particular sizes (e.g., 6 inches in diameter) and/or having particular durability ratings (e.g., delicate vs. robust) that characterize the objects' ability to withstand high pressure and/or temperature during washing.

Objects may also be associated with particular locations, e.g., whether they are in an upper or lower rack or in a silverware basket, or in some instances, with greater particularity as to location within a particular receptacle of the dishwasher, e.g., in zone 1 of 6 in the upper rack. In addition, object orientation may be determined in some embodiments, e.g., based upon patterns or shapes disposed on various surfaces of the objects, as doing so may be useful when focusing spray on the objects to ensure that the surfaces most likely to contain soil are washed (e.g., the tops of plates, the insides of cups, the interior of a pot or pan, etc.)

Object detection may be based, in some embodiments, on one or more images captured by one or more imaging devices of an imaging system. Image analysis in some embodiments may be based on detection of basic patterns, e.g., dishes are flat and circular, bowls are deeper, glasses are cylindrical, etc. In other embodiments, however, more sophisticated image analysis may be performed, e.g., using one or more machine learning models trained to detect various objects in a dishwasher and output object data such as type, size, location, material, etc. The analysis may also discriminate between objects that constitute part of the load of the dishwasher, e.g., utensils, and components of the dishwasher, e.g., racks, baskets, etc.

In addition, in some embodiments consistent with the invention, at least one machine learning model utilized in object detection may be personalized for a particular dishwasher to optimize detection of the actual utensils that are regularly washed within the dishwasher, a concept referred to herein as personalized utensil detection. It will be appreciated, in particular, that the various types of utensils that may be washed within a dishwasher are practically innumerable. Beyond the numerous well-known and/or high-volume manufacturers of dishware, glassware, silverware, drinkware, and cooking utensils, there are countless smaller manufacturers who produce various unique shapes, patterns, colors, etc. of utensils, and new utensil designs are being introduced on a daily basis.

As but one example, coffee mugs are popular souvenirs and collector items and come in an endless array of colors, patterns, images, text, and shapes. Coffee mugs may also be used as promotional items, and may include unique company logos or information about a particular event in which the coffee mugs are distributed. Coffee mugs are also frequently given as gifts, and may be specific to particular holidays. Detecting a coffee mug, not to mention determining the state of a coffee mug (e.g., clean, dirty, stained, etc.) is consequently extremely challenging given the endless types of coffee mugs that exist in the world.

While generalized machine learning models trained to detect utensils will likely continue to improve with advances in technology, the performance of such models will continue to be inherently limited by the practically limitless types of utensils that such machine learning models will be tasked to detect. Embodiments consistent with the invention, on the other hand, may utilize a personalized machine learning model for a particular dishwasher that has been specifically trained to detect one or more personalized utensil types for utensils expected to be utilized in the dishwasher, thereby optimizing the performance of the personalized machine learning model for the particular utensils that are regularly washed by the dishwasher.

A personalized machine learning model, within the context of this disclosure, may therefore be considered to be a machine learning model that has been specifically trained using captured images of one or more specific utensils that are or will be washed by the dishwasher in regular use. A personalized machine learning model may also be trained to detect standard utensils (e.g., to detect standard utensil shapes, patterns, models, etc.) such that the personalized machine learning model may still be capable of detecting utensils in the absence of any specific training for those particular utensils. In some embodiments, for example, a standard machine learning model capable of detecting standard utensils may be initially shipped with new dishwashers, and then later personalized (e.g., after installation of a dishwasher in a particular user's residence) to optimize the performance of the machine learning model in detecting that user's particular utensils.

A personalized utensil type, in turn, may refer, within the context of the disclosure, to a particular type of utensil (e.g., in terms of a machine learning model, a classification output by the model) that may be identified by a personalized machine learning model. A personalized utensil type may, in some instances, identify a single, unique utensil (e.g., a specific coffee mug that a user was given as a gift), while in other instances, a personalized utensil type may identify a particular type of utensil of which a user has many (e.g., a set of plates having a common shape and/or pattern). Therefore, it is not necessary in some embodiments for a personalized machine learning model for a particular dishwasher to be trained using captured images of each and every individual utensil that may be washed in the dishwasher.

As will become more apparent below, a personalized machine learning model in some instances may be locally stored and executed in a dishwasher, while in other instances, a personalized machine learning model may be resident in a computing device that is external to a dishwasher, e.g., a user's mobile device or other computing device, a remote service, etc. In addition, training of a personalized machine learning model may be performed locally in a dishwasher and/or externally in a mobile device, computing device, or remote service, and may be based on training images generated by an imaging device of a dishwasher in some instances. In other instances, training may be based on training images generated by an imaging device of an external mobile device or other computing device.

Personalized utensil types detected by a personalized machine learning model may be used to control various parameters of a wash cycle in different embodiments. For example, personalized utensil types may be used to determine a number of utensils in the dishwasher, the location(s) of particular utensils in the dishwasher, the types of utensils in the dishwasher (e.g., delicate stemware vs. cast iron cookware), the orientation of utensils in the dishwasher (e.g., to detect overturned cups), etc. In addition, based upon training of a personalized machine learning model to detect a personalized utensil type using a utensil in its clean state, it may also be possible in some instances to detect the states of particular utensils in the dishwasher (e.g., clean, dirty, level of soiling, locations of specific spots or stains) based upon differences detected from the "clean" state of a particular personalized utensil type. It should be appreciated that, for example, if a coffee mug has a specific design, detection of a stain or spot on the coffee mug would be difficult to detect absent an understanding of the appearance of the specific design when the coffee mug is clean.

The parameters of a wash cycle that may be controlled may include various parameters such as number and/or duration of different phases of a wash cycle (e.g., prewash, wash, rinse, drying, etc.), completion of particular phases of a wash cycle (e.g., when drying is complete), wash or rinse fluid volumes or temperatures, etc. In addition, parameters such as control over controllably-movable sprayers to focus on how to wash particular zones or particular utensils in the dishwasher (e.g., fluid pressure, washing duration, etc.), whether to skip washing in empty zones in a dishwasher, etc., whether to use a gentle or more robust spray on certain utensils, etc., may also be controlled. Other types of wash parameters may be customized or controlled based upon knowledge of the utensils in a load in a dishwasher, as will be appreciated by those of ordinary skill having the benefit of the instant disclosure, so the invention is not limited to the specific wash parameters mentioned herein. For example, various manners of controlling a dishwasher wash cycle based in part on detection of utensils are described in U.S. Pat. No. 11,484,183, which is assigned to the same assignee as the present application, and which is incorporated by reference herein.

Figure 3:
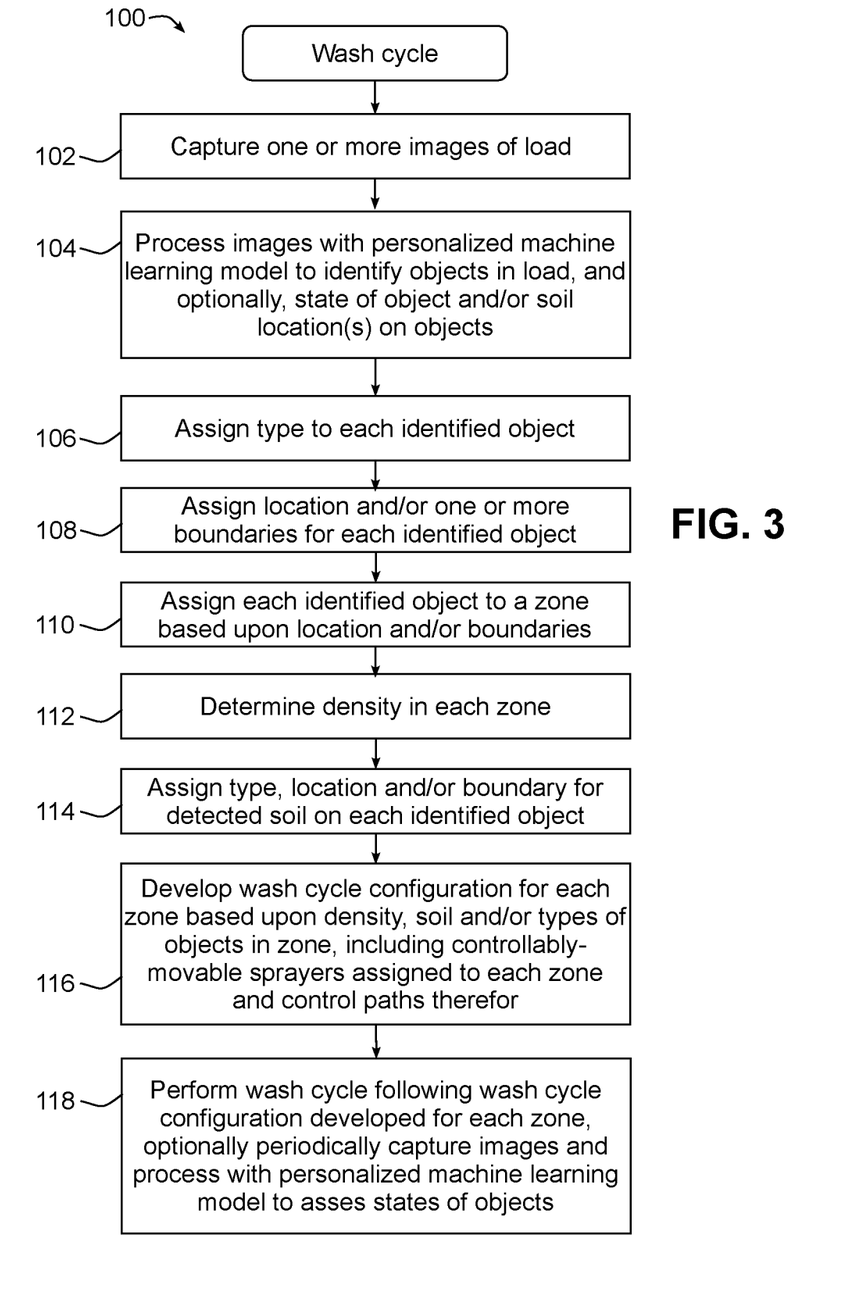
FIG. 3 is a flowchart illustrating an example operational sequence for performing a wash cycle using personalized utensil detection with the dishwasher of FIGS. 1-2.

FIG. 3, for example, illustrates an example operational sequence 100 for performing a wash cycle using personalized utensil detection as described herein. As illustrated in FIG. 3, for example, one or more images may be captured of a load in block 102, e.g., during loading of the dishwasher, after the door of the dishwasher is closed, immediately prior to starting the wash cycle, or at various points during the wash cycle. The images may be captured from one or more perspectives, may be two or three dimensional in nature, and may be stitched together in some instances, and illumination within the wash tub may be used in some instances as well. In some embodiments, for example, images may be captured after every door closing or detected rack movement. By doing so, multiple images may be combined to better determine the contents of a load, and further may minimize or otherwise mitigate image impingement of multiple items that may otherwise inhibit detection. The image capture may be performed by one or more cameras or image sensors of the dishwasher (e.g., camera 60) and/or by a camera or image sensor of a user device (e.g., user device 56) prior to initiation of the wash cycle. In addition, in some embodiments one or more videos may be captured and still images may be extracted from the videos.

Block 104 next analyzes the images to identify the objects in the load, and then based upon the identified objects, various characteristics of the objects are identified. In block 104, for example, the analysis of the images may be performed by processing the images with one or more personalized machine learning models (e.g., one or more of personalized machine learning models 64, 66, 68). Where a local personalized machine learning model 64 is used, for example, controller 30 of dishwasher 10 may execute personalized machine learning model 64 to analyze the images. Alternatively, where a personalized machine learning model is resident on a device external to the dishwasher, controller 30 may communicate the captured images to the external device (e.g., a user device 56 and/or a remote service 58) and then receive back from the external device information about the objects in the load, such that the controller can generate one or more parameters for the wash cycle in blocks 106-116, and then perform the wash cycle in block 118. In other embodiments, rather than providing information about the objects in the load, the external device may perform one or more of blocks 106-116 and then return one or more parameters to be used by controller 30 when performing the wash cycle in block 118, i.e., at least some of the parameters for a wash cycle may be generated externally from the dishwasher in some embodiments. Other manners of allocating execution of the blocks of operational sequence 100 between a dishwasher controller and an external device may be used in other embodiments.

In some embodiments, a personalized machine learning model may be configured to detect objects other than utensils, e.g., components within the wash tub of the dishwasher such as racks, silverware baskets, etc. In addition, in some embodiments, a personalized machine learning model may also be configured to detect object states (e.g., clean vs. dirty), orientation, and/or the presence, and optionally, the location of soil on an object. It will be appreciated that based upon the personalized nature of the personalized machine learning model, cleanliness as well as the location of soil on an object may be enhanced for some utensils, particularly those including unique designs or patterns. If a particular pan, for example, has one or more spots with baked on food residue, it may be desirable to direct additional attention to that object, and in some instances, to the spot itself. In some embodiments, a personalized machine learning model may also be capable of assigning a type to a soil or spot on a utensil, e.g., a type of food, whether it is caused by cooking (e.g., if present on a cooking utensil), whether it appears caked-on or burnt, etc.

In addition, block 104 in some embodiments may include additional pre-processing. Pre-processing may be used, for example, to construct 3D models of objects in the dishwasher, to extract dishwasher features or structures (e.g., the racks, the spray devices, the wash tub walls, the sump, etc.) from the images, or to otherwise transform the data from the images to a suitable format for input to the personalized machine learning model.

Next, in block 106, a type, e.g., including a class, material, shape, size, durability, etc. may be assigned to each object based on the image analysis performed by the personalized machine learning model. In addition, as illustrated in block 108, a location and/or one or more boundaries may be assigned to each object based on the image analysis. Then, in block 110, each object may be assigned to a particular zone based upon its location and/or boundaries. In some embodiments, for example, different regions of different racks may be associated with different zones, such that objects within those zones are washed collectively using a particular configuration or customization specific to that zone (including no washing in the event that a particular zone is empty). Different numbers and layouts of zones may be used in different embodiments, thereby varying the degree of customization that is utilized for a particular dishwasher.

Next, in block 112, a density may optionally be determined for each zone, representing the number and/or relative size, surface area, or volume of the objects assigned to a zone. It will be appreciated that in many instances zones with greater density will generally benefit from additional attention during a wash cycle, so identifying a density of each zone may be used to configure wash settings such as the duration or percentage of time devoted to a particular zone.

Next, in block 114, a type, a location and/or a boundary may be assigned for each detected spot of soil in some embodiments. In addition, in some embodiments some spots may be ignored, e.g., if they are determined to be too small, easily washable, or otherwise not sufficient to warrant specific attention during a wash cycle. Then, in block 116, a wash cycle configuration may be determined for each zone based upon one or more of the density, soil and/or types of objects located in each zone. The configuration may include parameters such as wash temperatures, durations of operations, numbers of operations, spray patterns, and/or spray pressures in some embodiments. Moreover, a wash cycle configuration may also include specific control parameters for one or more controllably-movable sprayers, e.g., to which zones a particular controllably-movable sprayer is to be assigned at different points in a wash cycle, as well as the sweep, rate of rotation and/or rotational positions to be used at different points in a wash cycle, etc. (collectively referred to herein as control paths for the sprayer). One type of controllably-movable sprayer that may be used in some embodiments, for example, is a tubular spray element, which is disclosed in further detail in the aforementioned '183 patent. Further, additional types of configurations may be based upon types of objects in a zone, e.g., metal cooking containers may warrant additional sprayers, added soak time, spray isolation to protect other objects, while glass objects such as glassware may warrant lower temperatures to prevent damage, lower pressure to prevent dislodgement, narrower spray patterns to focus on the interiors thereof.

Then, once the wash cycle configuration is determined, block 118 may perform the wash cycle, and in doing so, following the wash cycle configuration developed for each zone. it will be appreciated that some of the various characteristics of a load discussed above may not be determined or considered in the generation of a wash cycle configuration in some embodiments, and that other characteristics may also be determined or considered in other embodiments. Therefore, the invention is not limited to the particular combination of factors used in FIG. 3 to generate a wash cycle configuration.

Figure 4:
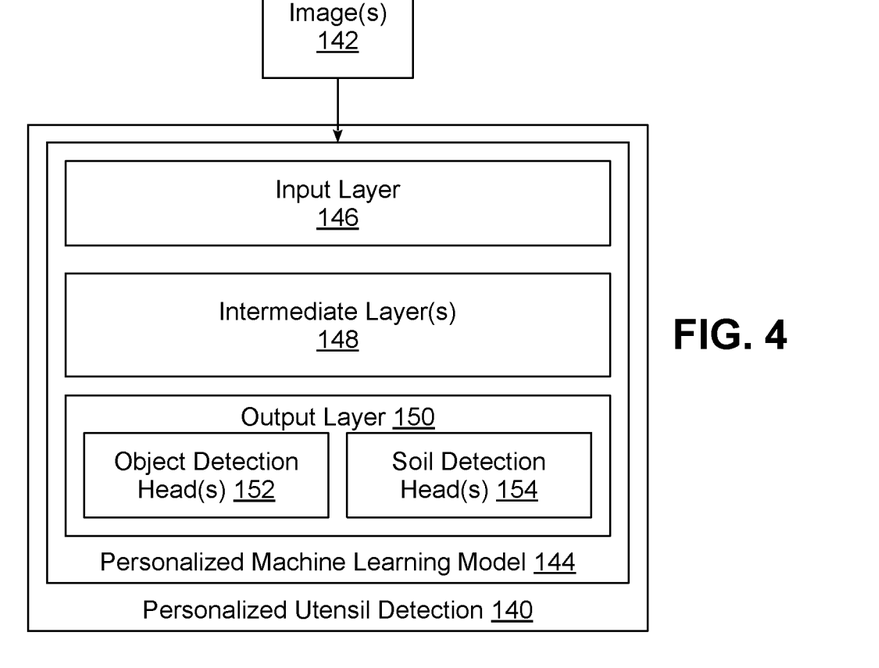
FIG. 4 is a block diagram illustrating an example personalized utensil detection system incorporating a personalized machine learning model suitable for use in personalized utensil detection with the dishwasher of FIGS. 1-2.

FIG. 4 next illustrates one example manner of implementing a personalized machine learning model, e.g., any of personalized machine learning models 64, 66, 68 of FIG. 2. FIG. 4, in particular, illustrates an example personalized utensil detection system 140 capable of being implemented within a dishwasher or external of a dishwasher, e.g., in a user device or remote service, and that receives as input one or more captured images 144, e.g., as captured by one or more cameras or image sensors in a dishwasher and/or on a user device.

Personalized utensil detection system 140 includes a trained personalized machine learning model 144 that is configured to, in part, detect a plurality of objects in the captured images. Model 144 in the illustrated embodiment is also capable of detecting soil on detected utensils, and as such may be implemented as a multi-head machine learning model, although in other embodiments a single head model may be used and/or no soil or other state detection may be implemented.

In some embodiments, for example, model 144 may be implemented as a deep neural network (DNN) including an input layer 146, one or more intermediate layers 148, and an output layer 150 including one or more object detection heads 152 and one or more soil detection heads 154. In some embodiments, for example, one or more intermediate layers 148 may include one or more convolutional layers. The dimensions/shape of input layer 146 may be dependent on the shape of the image data to be applied, while the dimensions/shape of each output head 152, 154 may be dependent on various factors such as how many class probabilities are to be predicted, among others. In some embodiments, multiple convolution layers may be provided, and max pooling and/or other layers such as affine layers, softmax layers and/or fully connected layers may optionally be interposed between one or more of the convolution layers and/or between a convolution layer and the output layer. Other embodiments may not include any convolution layer and/or not include any max pooling layers, and in still other embodiments, other machine learning models may be used, e.g., Bayesian models, random forest models, Markov models, etc.

Figure 5:
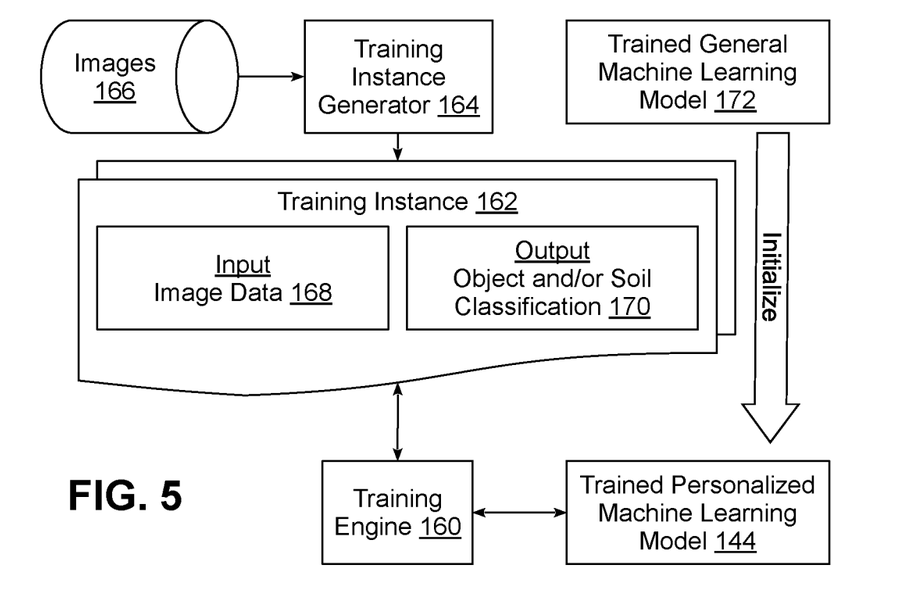
FIG. 5 is a block diagram illustrating a training system for training the personalized machine learning model of FIG. 4.

FIG. 5 illustrates a system for training model 144, e.g., using a training engine 160 that utilizes training instances 162 generated by a training instance generator 164 from a set of images 166 captured of various user-specific utensils. Generator 164 may process images 166 to generate, for each training instance 162, an input 168 including image data of a utensil, and an output 170 including object and/or soil classifications. In some embodiments, for example, the training instance output 170 may define, for each of a plurality of spatial regions, whether an object of one or more classes is present in the spatial region and/or whether any soil of one or more classes is present in the spatial region. In training model 144, training engine 160 may apply the training instance input 168 to model 144 and process the training instance input 168, utilizing model 144 and based on current parameters of model 144, to generate an output having a dimension that conforms to the dimension of training instance output 170. Training engine 160 may then compare the generated output to the training instance output 170, and update one or more parameters of model 144 based on the comparison. For example, training engine 160 may generate an error based on differences between the generated output and the training instance output 170, and backpropagate a loss (that is based on the error) over model 144 to update model 144.

As model 144 is a multi-head model that incorporates at least one object detection head 152 and at least one soil detection head 154, different subsets of training instances may be used, thereby co-training the different output heads 152, 154 and jointly optimizing the model for both object and soil detection functionality. Where soil detection is not incorporated into model 144, however, only training instances associated with object detection may be used.

In addition, generation of a personalized machine learning model such as model 144 may be based on personalizing a generalized machine learning model trained to recognize a large corpus of utensils. Thus, when training model 144, the model may initially be initialized with a trained general machine learning model 172. In some embodiments, for example, when a dishwasher is first installed, and where no personalization has yet been performed, utensil detection may use a general machine learning model that has been trained to recognize standard utensils. Then, when a user undergoes a personalization process by capturing images of one or more of the user's personal utensils, the general machine learning model is further trained using the captured images to generate the trained personalized machine learning model 144, in effect personalizing or optimizing the general machine learning model to recognize that user's personal utensils.

Figure 6:
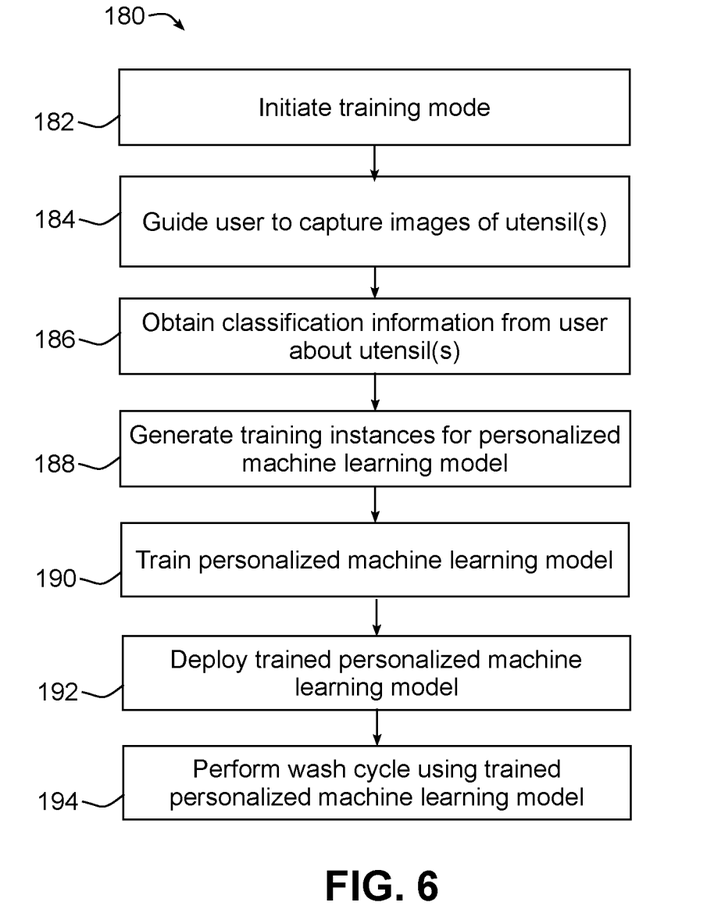
FIG. 6 is a flowchart illustrating an example operational sequence for training and deploying a personalized machine learning model with the dishwasher of FIGS. 1-2.

FIG. 6 illustrates an example operational sequence 180 for training and deploying a personalized machine learning model consistent with some embodiments of the invention. Operational sequence 180 may be performed within a dishwasher (e.g., using a controller 30), in a remote device such as a user device or a remote (e.g., cloud) service, or using a combination thereof. In some embodiments, for example, training may be coordinated by an app running on a mobile device and in communication with a dishwasher, given the typical limited user interface of many dishwasher designs.

In block 182, a training mode is initiated, e.g., through user selection of a training mode option in an app on the user's mobile device. Then, in block 184, the user is guided to capture images of one or more utensils to be used to personalize the machine learning model used for personalized utensil detection. It may be desirable, for example, to capture images of each utensil from multiple viewpoints such that all of the surfaces of the utensil are visible.

Next, in block 186, additional classification information may also optionally be obtained from the user for each utensil to assist in training. The additional classification information can include practically any information suitable in assisting in classifying the utensil, e.g., a type of utensil (plate, glass, pan, etc.), whether it is unique or part of a set, etc. Then, in block 188, the images and any provided classification information are used to generate training instances, and in block 190, the personalized machine learning model is trained, in a manner that will be understood by those of ordinary skill having the benefit of the instant disclosure. The generation of training instances may also include pre-processing of the captured images similar to that described above in connection with block 104, e.g., to generate 3D models, to extract surrounding features in the images, etc.

Next, in block 192, the trained personalized machine learning model is deployed, e.g., by overwriting a previous version of a machine learning model used by the dishwasher, such as a generalized machine learning model that is shipped with the dishwasher or resident in an external device or remote service, or a previous version of a personalized machine learning model that has previously been stored in the dishwasher, an external device or remote service. Deployment may also, in some embodiments, include communicating the personalized machine learning model to the dishwasher, e.g., where the personalized machine learning model is executed locally by the dishwasher but training is performed externally from the dishwasher, e.g., in a user device or a remote service.

Once deployed, the personalized machine learning model may be used in subsequent wash cycles performed by the dishwasher (block 194), and operational sequence 180 is complete. It will be appreciated that training may be performed iteratively and over time in some embodiments, such that, for example, if a user acquires additional utensils at a later date, further training may be performed.

Figure 7:
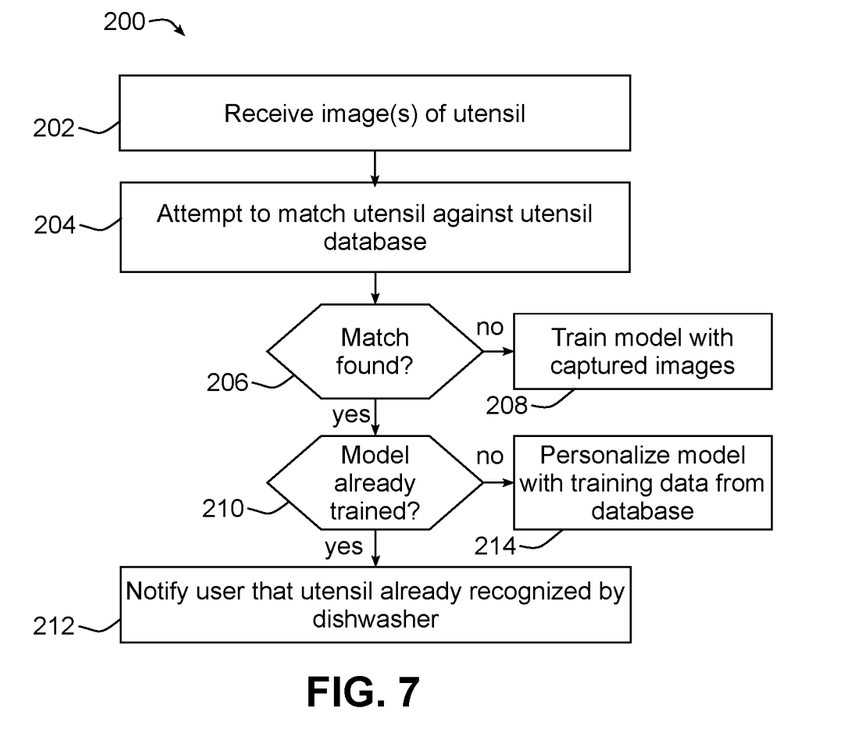
FIG. 7 is a flowchart illustrating an example operational sequence for detecting a previously-identified utensil with the dishwasher of FIGS. 1-2.

In some embodiments, it may also be desirable to detect previously-identified utensils during a training process, and potentially avert the need to train a personalized machine learning model for certain utensils. FIG. 7, for example, illustrates an example operational sequence 200 that may be performed to detect a previously-identified utensil. For example, it may be desirable in some embodiments to maintain a database of known utensils, which in some instances, may have been used to train the generalized machine learning model, or in other instances, may have stored training instances or other training data that may be used to train a personalized machine learning model, without having to rely on images captured by a user. Determination that a utensil is already in a utensil database may rely on image recognition, e.g., via a trained machine learning model, that maps images of a utensil with identifying information for a utensil, and in some instances, training data that may be used to personalize a personalized machine learning model to recognize the utensil.

Operational sequence 200 may therefore begin in block 202 by receiving one or more images of a utensil, and then in block 204 attempt to match the utensil against a utensil database. If no match is found in block 206, control may pass to block 208 to train the model with the capture image(s), in a similar manner to that described above in connection with FIG. 6. If a match is found, however, block 206 may pass control to block 210 to determine if the personalized machine learning model (or the generalized machine learning model from which the personalized machine learning model has been adapted) has already been trained to detect the specific utensil type associated with the utensil represented in the captured images. If so, there is no need to train or otherwise modify the personalized machine learning model to detect the utensil, so control may pass to block 212 to notify the user that the utensil is already recognized by the dishwasher, and training may be aborted.

If, however, the model has not already been trained to detect the utensil, control may pass to block 214 to personalize the model with training data associated with the utensil in the utensil database. In some embodiments, it may be desirable to maintain optimized training data for each utensil that is stored in the database, but that is otherwise not accounted for in the generalized machine learning model initially used by the dishwasher, such that the training data (which may be higher quality than the images captured by the user) can be used to train the model to detect the utensil.

Figure 8:
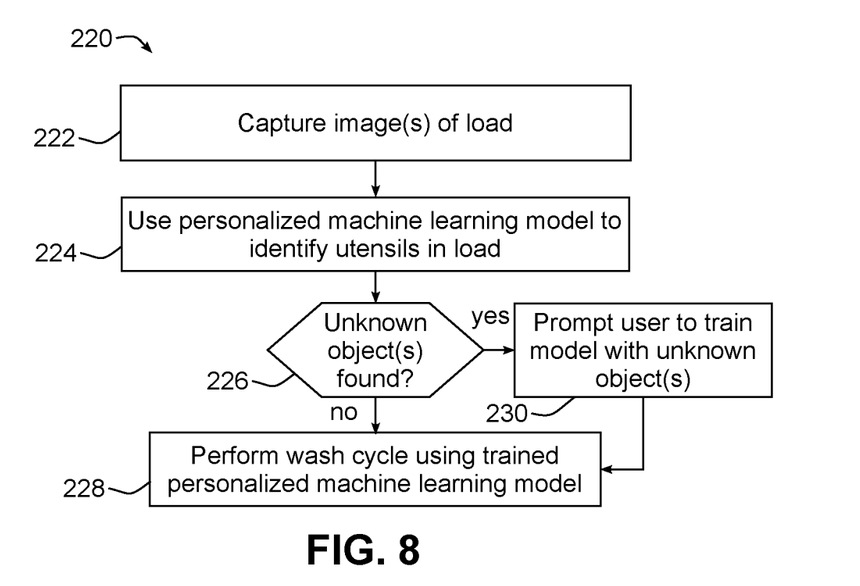
FIG. 8 is a flowchart illustrating an example operational sequence for suggesting training for an unknown utensil with the dishwasher of FIGS. 1-2.

Now turning to FIG. 8, it may also be desirable in some embodiments to detect unknown utensils in a load and suggest training and personalization of the personalized machine learning model to detect the unknown utensil. For example, as illustrated by operational sequence 220, after a dishwasher has been loaded, one or more images of the load may be captured (block 222), and the images may be processed by a personalized machine learning model to identify utensils in the load (block 224), in a similar manner to blocks 102 and 104 of FIG. 3. Next, block 226 may determine if any unknown object(s) have been found, e.g., based upon identifying a utensil that is not identified as a particular utensil type with the personalized machine learning model.

If all objects are known, control may pass to block 228 to perform the wash cycle in a similar manner to that described above in connection with FIG. 3. If, however, one or more unknown objects are detected in the load, control may pass to block 230 to prompt the user to train the model with the detected unknown objects, e.g., to perform operational sequence 180 of FIG. 6 prior to performing the wash cycle in block 228. In some embodiments, for example, one or more images of the unknown object(s) may be presented to the user, e.g., via an app on a mobile device, and a suggestion may be made to enter a training mode to train the personalized machine learning model to detect the unknown objects as particular personalized utensil types.

Figure 9:
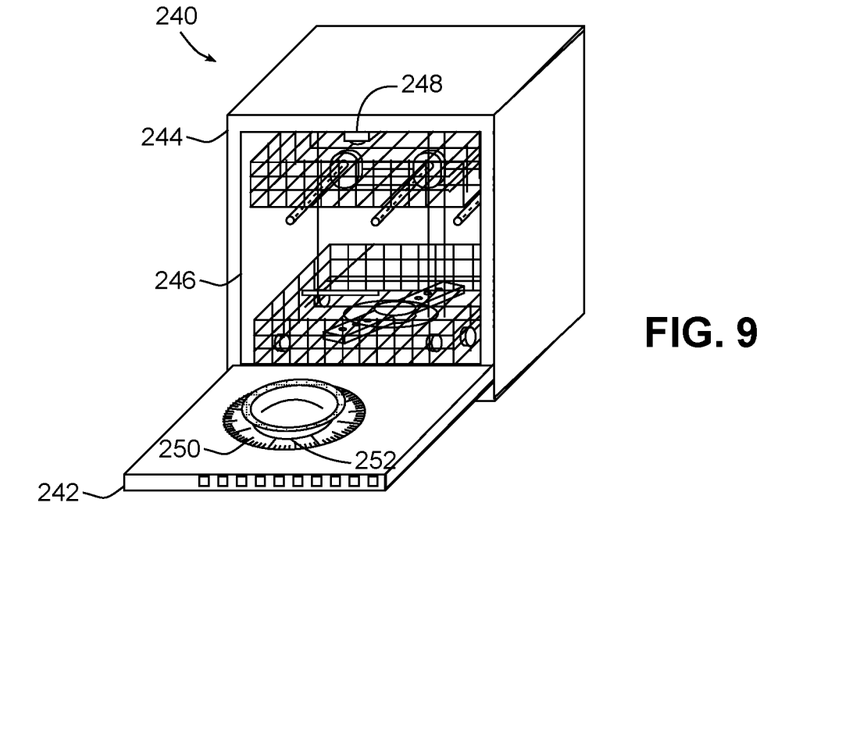
FIG. 9 is a perspective view of a dishwasher consistent with some embodiments of the invention, and including a utensil positioned on a scanning aid thereof.

The manner in which images of a utensil may be captured may vary in different embodiments. For example, in some embodiments, images may be captured with the use of one or more scanning aids that provide a fixed frame of reference from which size and orientation of a utensil may be determined. FIG. 9, as an example, illustrates a dishwasher 240 including a door 242, housing 244, and wash tub 246, wherein door 242 provides external access to wash tub 246 when door 242 is in an open position as illustrated in FIG. 9. A camera 248 is disposed proximate the top of wash tub 246, and its field of view projects at least partially over a scanning aid 250 formed on an inner surface of door 242. Thus, when a utensil such as bowl 252 is placed on scanning aid 250, and images captured using camera 248 may reference the visible portions of scanning aid 250 in determining a size and orientation of bowl 252.

Figure 10:
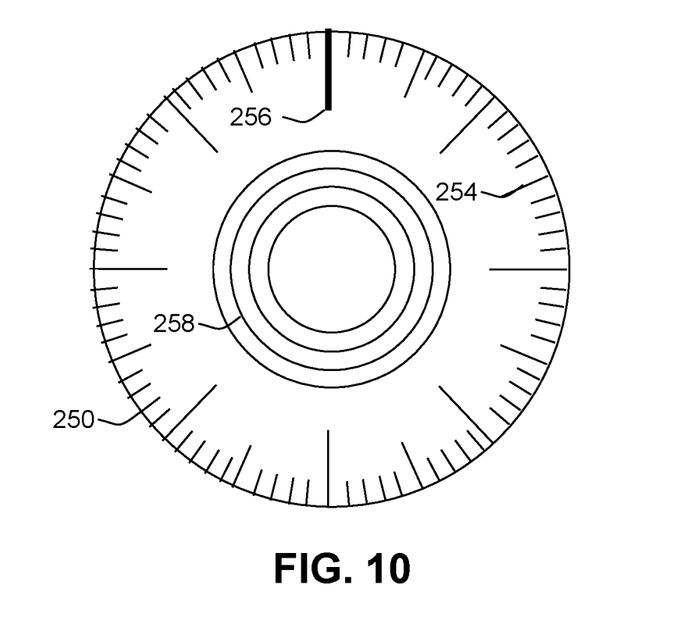
FIG. 10 is a top plan view of the scanning aid of FIG. 9.

While numerous variations of scanning aid 250 are contemplated, FIG. 10 illustrates one example implementation of scanning aid 250, being circular in nature and including a plurality of radial segments 254 extending circumferentially around the scanning aid. Radial segments 254 may be of different radial lengths (similar to a clock) to allow for an angular determination to be made, and in some instances, one or more radial segments, e.g., radial segment 256, may be uniquely defined to delineate a "home" angular position. In addition, one or more concentric circles 258 having predetermined diameters may also be provided to allow for size determination, based upon the number of concentric circles that are visible when a utensil is placed on the scanning aid.

Numerous other scanning aid designs may be used in other embodiments. For example, in another design, a plurality of concentric circles may be provided, each with radial segments similar to radial segments 254, or a plurality of concentric circles may be combined with a single set of radial segments that extend outward from the geometric center of the concentric circles. In still other embodiments, other combinations of unique reference points may be incorporated into a scanning aid, e.g., reference points forming three corners of a square, similar to a QR code. As such, a scanning aid consistent with the invention may be considered to include practically any design suitable for determining a size and/or angular orientation of a utensil in an image captured of the utensil and/or to align multiple images of such a utensil within a common frame of reference.

Scanning aid 250 may be formed on door 242 in a number of different manners, e.g., by molding, stamping or otherwise forming indentations or raised features on the surface of the door, by printing features on the door, using an adhesive label on the door, or practically any manner of forming distinct features on a dishwasher surface. In addition, in some embodiments, at least a portion of a scanning aid may be formed by components that serve other functions on a dishwasher, e.g., where a vent or dispenser on the door forms at least a portion of the scanning aid.

As noted above, in one embodiment, camera 248 is used to capture images of a utensil placed on the scanning aid. In other instances, a user may capture images using a mobile device, e.g., with the guidance of an app running on the mobile device. The user may capture images of the utensil from multiple perspectives in some instances, and the user may be prompted to move or reorient the utensil before capturing additional pictures in some instances, e.g., to capture all of the visible surfaces of the utensil. In such instances, the scanning aid may be used to, for example, align or transform all of the images to a common frame of reference, to generate a 3D model of the utensil, etc.

Figure 11:
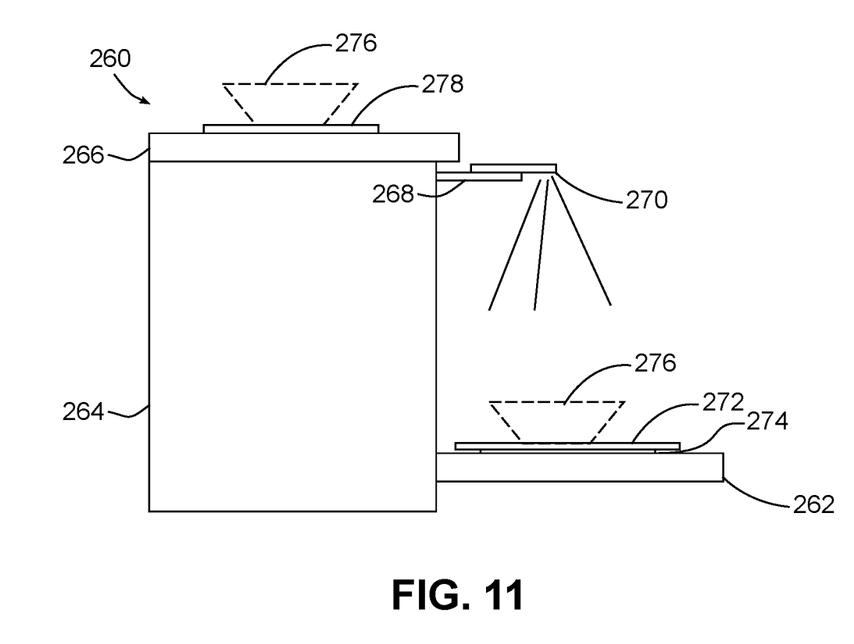
FIG. 11 is a side view of a dishwasher consistent with some embodiments of the invention, and including a countertop showing an alternate location for a scanning aid.

In addition, with reference to FIG. 11, it will be appreciated that a scanning aid consistent with the invention may be used in a number of additional different manners, and may be implemented in a number of additional different configurations. FIG. 11 illustrates a dishwasher 260 including a door 262 joined to a cabinet 264 and positioned under a countertop 266. In this embodiment, rather than using a dishwasher-mounted camera, a holder 268 may be provided to allow a user to support a mobile device 270 in a fixed location above a scanning aid. The holder 268 may be removable in some embodiments, or may be movable between a storage and an operative position, and may have a configuration that is suitable for supporting various types of mobile devices such that all images are captured from the same orientation and position.

In addition, in some embodiments, a scanning aid, e.g., scanning aid 272, may be supported by a rotatable support 274, which may be motorized or manually rotatable, to enable a utensil 276 supported by the scanning aid 272 to be captured in multiple orientations. In some embodiments, a scanning aid may be fully rotatable, while in other embodiments, a portion of the scanning aid may be defined around the outside of a rotatable portion to allow for a single angular frame of reference to be used.

In addition, as illustrated by scanning aid 278 disposed on countertop 266, a scanning aid consistent with some embodiments of the invention may be entirely separate from a dishwasher, and formed, for example, as a mat, a sheet, or an adhesive label that is provided with the dishwasher. Such a scanning aid may be used, for example, when it is not desirable for aesthetic reasons to include a permanent scanning aid on the surface of a dishwasher door.

It will also be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another. Various additional modifications may be made to the illustrated embodiments consistent with the invention. Therefore, the invention lies in the claims hereinafter appended.

What is claimed is:

1. A dishwasher, comprising:
 a wash tub;
 an upper rack and a lower rack supported in the wash tub, each rack configured to support a plurality of utensils and movable between a loading position and a washing position, wherein each rack is disposed in the washing position during a wash cycle;
 a door providing external access to the wash tub;
 a scanning aid disposed on an inner surface of the door and configured to support a utensil when the door is in an open position and the lower rack is in the washing position, and wherein the scanning aid is sized and positioned on the inner surface of the door to directly support the utensil when the lower rack is in the washing position;
 at least one spray device disposed in the wash tub;
 a fluid supply configured to supply wash fluid to the at least one spray device during the wash cycle that washes a load, the fluid supply including at least one pump; and
 a controller coupled to the at least one pump, the controller configured to control at least one parameter of the wash cycle based at least in part on detecting the utensil in the load, wherein the utensil detected in the load is of a personalized utensil type, and wherein the utensil is detected in the load by processing image data from an image captured of at least a portion of the load with a personalized machine learning model that is trained to detect the personalized utensil type using one or more training images captured of the utensil subsequent to installation of the dishwasher;
 wherein the controller is further configured to receive user input from a user to enter a training mode, initiate the training mode in response to the user input from the user, and during the training mode, guide the user to capture the one or more training images of the utensil from different viewpoints while the utensil is directly supported on the scanning aid and the lower rack is disposed in the washing position, including prompting the user to move or reorient the utensil after capturing a first training image of the one or more training images and before capturing a second training image of the one or more training images.

2. The dishwasher of claim 1, wherein the personalized machine learning model is disposed in the dishwasher, and the controller is configured to detect the utensil in the load by executing the personalized machine learning model.

3. The dishwasher of claim 1, wherein the personalized machine learning model is disposed in a user device in communication with the dishwasher, and the controller is configured to detect the utensil in the load by communicating the image data to the user device and receiving the personalized utensil type or the at least one parameter from the user device.

4. The dishwasher of claim 1, wherein the personalized machine learning model is disposed in a remote service in communication with the dishwasher, and the controller is configured to detect the utensil in the load by communicating the image data to the remote service and receiving the personalized utensil type or the at least one parameter from the remote service.

5. The dishwasher of claim 1, further comprising an image sensor, wherein the controller is configured to capture the image using the image sensor.

6. The dishwasher of claim 1, wherein the controller is in communication with a user device including an image sensor configured to capture the image, and the controller is configured to receive the image data from the user device.

7. The dishwasher of claim 1, wherein the scanning aid includes a plurality of radial segments from which an angular orientation of the utensil may be determined during training of the personalized machine learning model.

8. The dishwasher of claim 7, wherein the scanning aid includes a plurality of concentric circles from which a size of the utensil may be determined during training of the personalized machine learning model.

9. The dishwasher of claim 7, wherein the plurality of radial segments have differing length.

10. The dishwasher of claim 7, wherein at least a portion of the scanning aid is supported on a rotatable support, and the rotatable support is motorized or is manually rotatable.

11. The dishwasher of claim 7, further comprising a mobile device holder mounted to the dishwasher and configured to support a mobile device to capture images of the utensil during training of the personalized machine learning model.

12. The dishwasher of claim 1, wherein the at least one parameter includes a wash temperature, an operation duration, a number of operations, a spray pattern, a fluid pressure, a soak time, a spray isolation, or a control parameter for one or more controllably-movable sprayers.

13. The dishwasher of claim 1, wherein the controller is further configured to train the personalized machine learning model to detect the personalized utensil type for the utensil detected in the load using the one or more training images captured subsequent to installation of the dishwasher.

14. The dishwasher of claim 13, further comprising an image sensor disposed on the dishwasher and configured to capture the one or more training images.

15. The dishwasher of claim 13, wherein the controller is configured to detect the utensil in the load using the personalized machine learning model prior to the wash cycle being performed in the dishwasher.

16. The dishwasher of claim 13, wherein the controller is further configured to detect an unknown utensil in the image captured of the at least a portion of the load and prompt the user to train the personalized machine learning model to detect the unknown utensil.

17. The dishwasher of claim 16, wherein the personalized machine learning model is trained by personalizing a generalized machine learning model utilized with the dishwasher prior to training for any user-specific utensils.

18. The dishwasher of claim 13, wherein the controller is configured to detect that a second utensil is already recognized during training of the personalized machine learning model.

19. The dishwasher of claim 18, wherein the controller is configured to, in response to detecting that the second utensil is already recognized, train the personalized machine learning model using stored training data associated with the second utensil.

20. The dishwasher of claim 18, wherein the controller is configured to, in response to detecting that the second utensil is already recognized, notify the user that the second utensil is already recognized.

21. A dishwasher, comprising:
a wash tub;
an upper rack and a lower rack supported in the wash tub, each rack configured to support a plurality of utensils and movable between a loading position and a washing position, wherein each rack is disposed in the washing position during a wash cycle;
a door providing external access to the wash tub;
a scanning aid disposed on an inner surface of the door and configured to support a utensil when the door is in an open position and the lower rack is in the washing position, wherein the utensil is of a personalized utensil type, and wherein the scanning aid is sized and positioned on the inner surface of the door to directly support the utensil, and the scanning aid includes a plurality of concentric circles and a plurality of radial segments that provide a frame of reference from which a size and an angular orientation of the utensil may be determined;
at least one spray device disposed in the wash tub;
a fluid supply configured to supply wash fluid to the at least one spray device during the wash cycle that washes a load including the utensil, the fluid supply including at least one pump; and
a controller coupled to the at least one pump, the controller configured to control at least one parameter of the wash cycle based at least in part on detection of the utensil in the load, wherein the utensil is detected in the load by processing image data from an image captured of at least a portion of the load with a personalized machine learning mode that is teamed to detect the personalized utensil type using one or more training images captured subsequent to installation of the dishwasher and while the utensil is directly supported on the scanning aid and the lower rack is disposed in the washing position, wherein the controller is configured to train the personalized machine learning model using the one or more training images captured while the utensil is directly supported on the scanning aid and the lower rack is disposed in the washing position.

* * * * *